United States Patent [19]

Sayegh et al.

[11] Patent Number: 5,189,721
[45] Date of Patent: Feb. 23, 1993

[54] OPTICAL FIBER RIBBON CABLE

[75] Inventors: Emile G. Sayegh; Alfredo L. Cedrone, both of Austin, Tex.

[73] Assignee: W. L. Gore & Associates, Inc., Newark, Del.

[21] Appl. No.: 837,465

[22] Filed: Feb. 14, 1992

[51] Int. Cl.⁵ .................................. G02B 6/44
[52] U.S. Cl. .................................. 385/114
[58] Field of Search ............ 385/114, 127, 128, 141

[56] References Cited

U.S. PATENT DOCUMENTS

| | | | |
|---|---|---|---|
| 3,883,218 | 5/1975 | Slaughter | 385/114 X |
| 4,105,284 | 8/1978 | Olshansky | 385/127 |
| 4,113,358 | 9/1978 | Martin | 385/128 |
| 4,241,979 | 12/1980 | Gagen et al. | 385/114 X |
| 4,380,367 | 4/1983 | Suzuki | 385/141 |
| 4,468,089 | 8/1984 | Brorein | 385/114 |
| 4,730,894 | 3/1988 | Arroyo | 385/114 X |
| 4,744,631 | 5/1988 | Eichenbaum et al. | 385/114 |
| 5,002,359 | 3/1991 | Sayegh | 385/107 |
| 5,067,830 | 11/1991 | McAlpine et al. | 385/114 |
| 5,093,881 | 3/1992 | Bortolin et al. | 385/114 |

Primary Examiner—Akm E. Ullah
Attorney, Agent, or Firm—Gary A. Samuels

[57] ABSTRACT

An expanded polytetrafluoroethylene-buffered, polyester insulated, braided sheath strengthened, fire retardant jacketed optical fiber ribbon cable having precisely spaced optical fibers and a process for its manufacture.

8 Claims, 4 Drawing Sheets

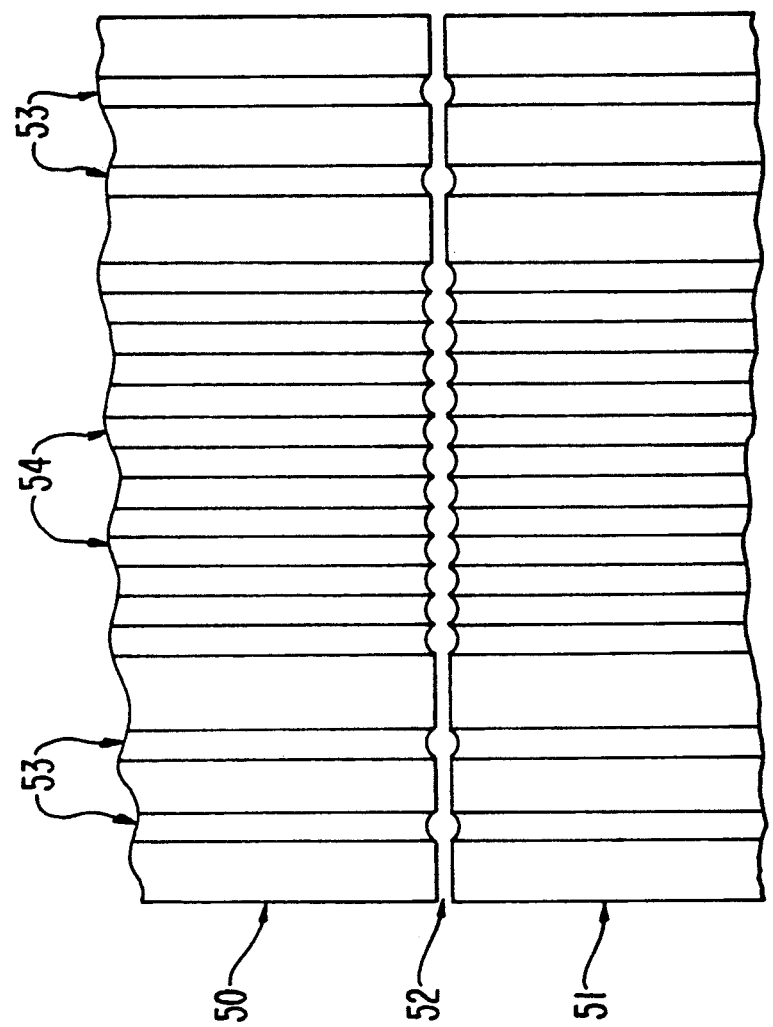

OPTICAL FIBER RIBBON CABLE

FIELD OF THE INVENTION

The invention relates to the field of optical waveguide fiber cables, particularly to cables embodying a multiplicity of optical fibers configured as a flat ribbon cable that is specifically designed to mate with mass termination systems.

BACKGROUND OF THE INVENTION

Optical glass fibers for communication are made from glass such as quartz glass or doped silica glass and are extremely small in diameter and hence weak in strength. Under normal conditions of use, such fibers may be subjected to considerable bending strain and other tensile forces during the cable manufacturing process and while being pulled through ducts and otherwise bent, twisted, or manipulated during reeling or during installation. In the transmission of light signals through optical fiber cables, the signals are readily attenuated in response to relatively small distortions in the cable, such as those caused by the above stresses, sharp bends or roughness in the surface of the fiber to produce light signal distortions or attenuation at an unacceptable level.

To confine the optical signals inside the signal-transmitting fiber core, a glass or silica fiber core is coated with a glass cladding or an amorphous fluoropolymer coating always of a lower refractive index from that of the optical fiber. The coating on the glass cladding may optionally be a silicone, acrylic, polyimide, or other release agent and a polymer coating, which is usually a hard or soft polymer coating which is coated on the fiber from a melt or a solution of the polymer, or extruded onto the fiber.

These considerations also apply to flat ribbon cables embodying a multiplicity of optical fibers arranged parallel to each other. Problems associated with ribbon cables occur in aligning the optical fibers parallel to each other at known and fixed distances apart. It is also crucial for a ribbon cable that is designed to mate with a mass termination system to have exact spacing with respect to a reference point. Crush resistance, flex life, and temperature and flame resistance of the cable can also be problems to be overcome.

Coating and buffering of optical fibers for various purposes are described in U.S. Pat. Nos. 5,002,359, 4,113,350, 4,105,284, 4,380,367, 4,072,400, 3,930,103, 4,463,329, 4,099,837, and 4,642,265 and in a paper in the Bell System Technical Journal, in Volume 54, No. 2, pages 245-262, February 1975, by D. Gloge.

SUMMARY OF THE INVENTION

The cable of the invention comprises an optical fiber ribbon cable having the layers inside to outside:
(a) a multiplicity of polymer coated optical fibers arranged parallel to each other at controlled fixed distances apart;
(b) surrounding the optical fibers as a unit on top and bottom sides of the unit, a first layer of porous expanded polytetrafluoroethylene, each side of which is coated by an adhesive;
(c) surrounding the first layer a second layer of polyester tape, which is coated on at least its inner side with a polyester adhesive layer;
(d) surrounding the polyester tape layer a braided sheath of aramid fibers;
(e) said braided sheath surrounded by a layer of tape-wrapped binder tape; and
(f) the braid sheath surrounded by an extruded jacket of flame retardent thermopolymer.

A preferred form of the cable of the invention embodies acrylic-polymer coated or clad glass or silica optical fibers, a polyester adhesive-coated porous expanded polytetrafluoroethylene (ePTFE) first tape layer, coated on at least one side with the adhesive, a polyester adhesive-coated polyester second tape layer, coated on both sides with the adhesive, and a flame retardant, preferably polyvinyl chloride (PVC) jacket. The braided sheath strength member is of a strong aramid fiber, such as Kevlar® (manufactured by E. 1. duPont de Nemours and Company).

The process for manufacture of the cable of the invention also forms a part of the invention in that it provides a cable having a precise, stable spacing of the optical fibers in the cable which are buffered and decoupled from the mechanical and temperature environment surrounding the cable.

BRIEF DESCRIPTION OF THE DRAWINGS

FIG. 5 is a partial sectional view of the grooved rollers used to form the insulation layers around the clad optical fibers of the cable.

DETAILED DESCRIPTION OF THE INVENTION

The cable and the process of the invention are now described with reference to the drawings to more clearly delineate the materials and structure of the cable of the invention and the process for its manufacture.

Figure 1:
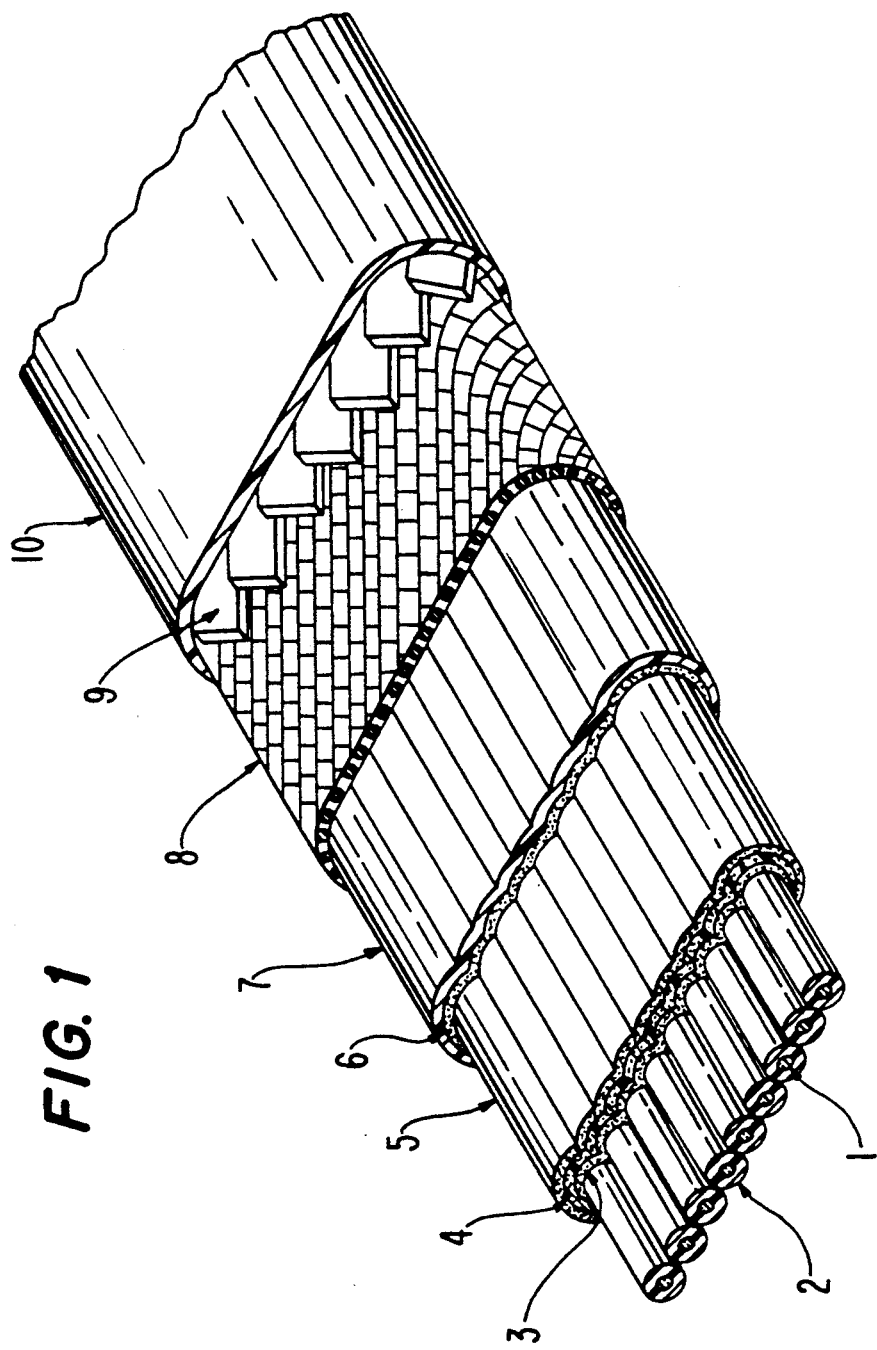
FIG. 1 is a cutaway perspective view of a cable of the invention to display all the layers thereof.

FIG. 1 is a perspective view of the cable of the invention with various layers cutaway to display the materials and structure of the cable. The clad optical fibers are aligned parallel to each other at known fixed distances apart, its being generally desirable that the separating distance between the fibers approach zero as nearly as possible. The glass or silica optical fibers 1 are clad with preferably a polymer cladding 2, an acrylic polymer being preferred, although other polymers known to be effective for cladding an optical fiber may be used.

Fibers 1 with cladding 2 are surrounded by a layer of porous expanded polytetrafluoroethylene (ePTFE) tape 4 which has on both sides a coating of adhesive 3 and 5, which is preferably a polyester-based adhesive. The adhesive is coated on the ePTFE film from a solvent, such as methylene chloride, or is adhered to the ePTFE as a film. Other adhesives may be used, such as polyurethane, fluorinated ethylene-propylene copolymers (FEP), perfluoroalkyl ethers of polytetrafluoroethylene (PTFE) polymers (PFA), and silicone-urethane polymers.

Applied over the adhesive-coated ePTFE tape is a strong polyester tape 7 which is adhesive 6 coated on at least the inner side adjacent the ePTFE tape. Polyester tape 7 is surrounded by a braided sheath 8 of strong aramid fibers, such as Kevlar (E. 1. duPont de Nemours & Company). Other materials useful for the braided fibers include RASTEX ® PTFE fiber (W. L. Gore & Associates, Inc.), Vectran ® (Hoechst Celanese), Technora ® (Tejin America Inc.), and Spectrafiber ® (Allied Chemical), for example. A binder ribbon 9 is wrapped around the braided sheath 8. Ribbon 9 is formed from ePTFE or a highly compressed and densified almost transparent PTFE tape (HSCR).

The cable is completed by extrusion of a flame-retardant jacket 10 around it, such as PVC.

Figure 2:
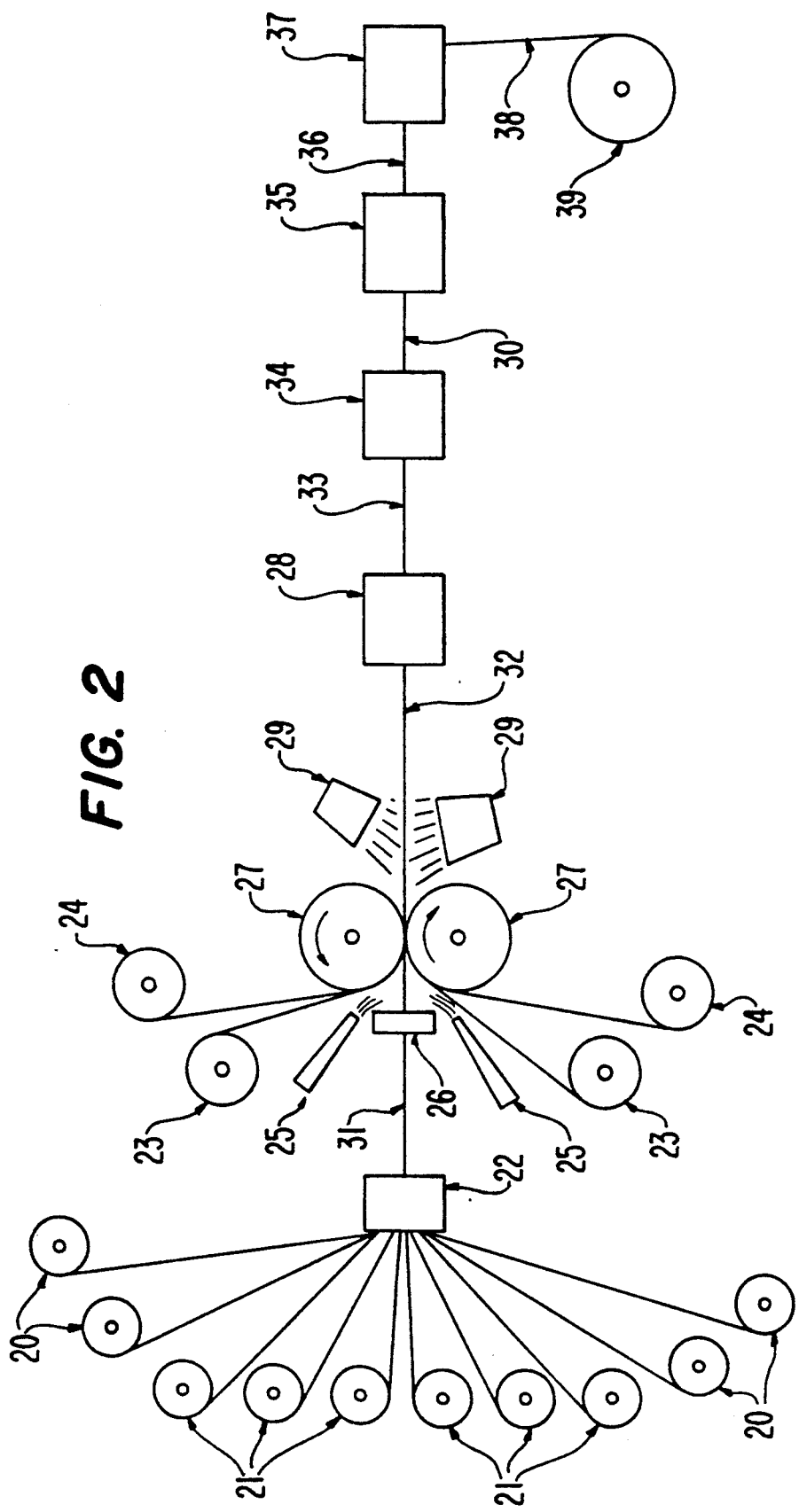
FIG. 2 is a schematic representation of the process for making a cable of the invention.

In FIG. 2 is diagrammed the process of making the cable of the invention. Spools 20 of guide wires and spools 21 of clad optical fibers have been set up on "trees" for feeding the wires and optical fibers into an accumulator 22. which contains banks of parallel rollers set in vertical and horizontal rows to direct the wires and fibers into a flat parallel row in similar configuration to their arrangement in the ribbon cable. Great care must be exercised to provide spools of optical fibers which have even back tension and which will pass evenly through the accumulator 22 smoothly to form a flat bundle 31 of fibers and guide wires in which all components are of even tension passing into guide 26.

Guide 26 (FIG. 4) is machined in two halves to close tolerances to position the optical fibers 40 and guide wires on the desired center to center spacing as they enter the nip of grooved rollers 27 which will apply pressure on the layers of ePTFE tape 4 and polyester tape 7 which feed into the nip on each side of the carefully aligned optical fibers and guide wires. The flat slot 48 precisely matches the width of the row of optical fibers and the apertures 49 contain the guide wires on each side of the optical fibers. Two guide wires are used on each side of the optical fibers for stability and cable flatness during the manufacture process. Sources of hot air 25, or other heated gas, supply hot air to the area just in front of rollers 27 to heat and soften the adhesive layers 3, 5, and 6 on the ePTFE and polyester tapes before they contact the surface of the optical fibers and guide wires in the nip of the rollers 27 under pressure. Rollers 27 have grooves carefully machined into their impinging surfaces to match the spacing of the optical fibers and guide wires to aid in proper formation of the insulation layers around the optical fibers and guide wires under the pressure of the rollers. In use, guide 26 has the two halves 45 and 46 closed together to form the slot 48 to proper dimensions (thickness) for guiding the optical fibers into the nip of rollers 27. ePTFE tapes (adhesive 3 and 5 on each side) and polyester tapes (adhesive 6 on the inner side adjacent the ePTFE tapes) unreel from spools 23 and 24 to pass into the nip of rollers 27 on the outside of both sides of the optical fibers and guide wires where they are sealed in place around them. Alternatively, polyester tapes 7 can be used without adhesive layer 6.

The formed cable 32 passes from rollers 27 under cold air (gas) streams from supplies 29 into slitter 25, where the edges of the cable and the guide wires are carefully trimmed from the cable to close tolerances to leave cable 33 containing the optical fibers.

Cable 33 then passes into a flat cable braider 34 of a type well known in the art of cable braiding wherein a braided sheath 8 of strong polymer fibers, such as Kevlar aramid fibers or fibers of equivalent strength properties, is applied. The now sheathed cable 30 then passes into a tape wrapper where a layer of binder tape 9 is wrapped nd the sheath at about 50% overlap to separate the braided sheath from an outer jacket. The cable 36. now carrying an outer layer of binder tape 9, passes into an extruder, wherein an outer protective flame retardant Jacket is applied surrounding the cable. The binder tape 9 is preferably ePTFE, but may be HSCR or other full density PTFE or other polymer tape. The extruded jacket is preferably flame resistant PVC, but may be other thermoplastic polymers known to be useful for jacketing, such as polyurethane, rubber, polyethylene, polypropylene or silicone, for example. The now jacketed cable 38 is taken up on storage reel 39.

Figure 4:
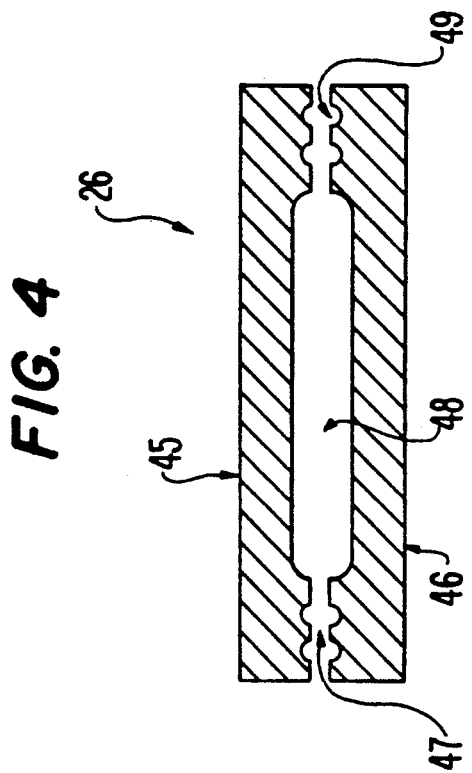
FIG. 4 is a cross-sectional view of a guide for aligning a multiplicity of optical fibers from the accumulator in a fixed spacing along with guide wires before entering the nip of the rollers used to apply insulation under pressure around the clad optical fibers.
Figure 3:
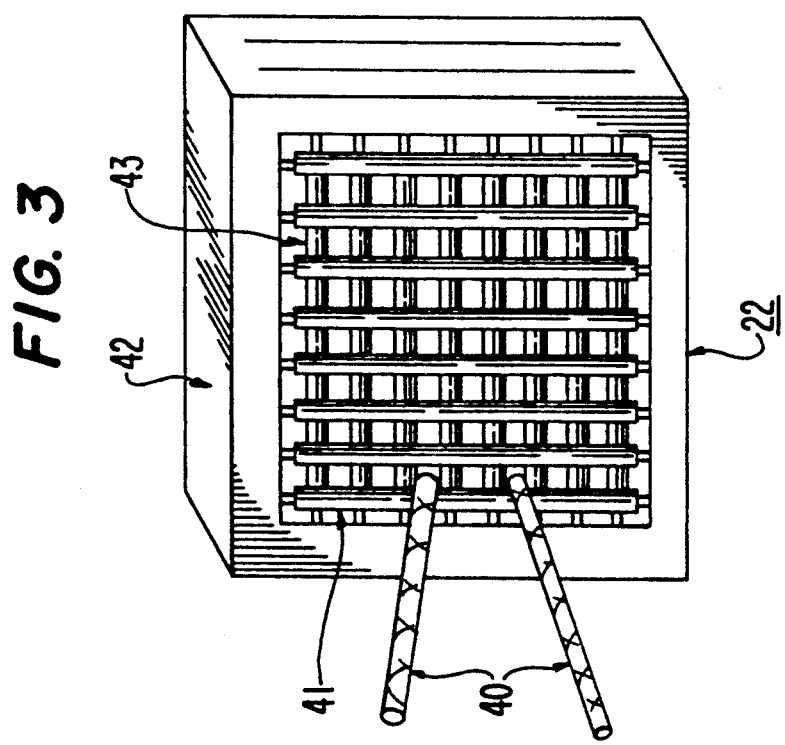
FIG. 3 is a perspective view of an accumulator, useful to align a multiplicity of clad optical fibers side by side in the process of manufacture.

FIG. 3 depicts in perspective view an accumulator 22 which receives on rows of parallel vertical 41 and horizontal 43 rollers optical fibers 40 and guide wires and aligns the fibers and wires into a flat configuration for easy passage into the guide 26 of FIG. 4 without appreciable torsion or back tension, which can distort both the shape and properties of the final cable after its manufacture.

FIG. 5 gives a partial view of the nip area between rollers 27 where the relationship and spacing between the grooves 54 to house clad optical fibers and grooves 52 to house guide wires is shown for a typical set of cable forming pressure rollers. Use of two sets of guide wires has been found to aid in achieving good stability and flatness properties in the ribbon cable.

The above process provides a well insulated and decoupled fiber optic ribbon cable which has edges of very stable dimensions in which the optical fibers are positioned precisely with reference to the edge such that when the datum edge of the cable abuts the edge of a connector, the optical fibers therein fall precisely into the grooves of the connector for easy and accurate termination of the cable to the connector.

We claim:

1. An optical fiber ribbon cable comprising in order from inside to outside:
    (a) a multiplicity of parallel polymer-coated optical fibers arranged at controlled fixed distances apart and from a datum edge of the cable;
    (b) said fibers surrounded as a unit on at least the top and bottom sides of the unit by a first layer of tape comprising porous expanded polytetrafluoroethylene having each side coated by an adhesive;
    (c) said first layer surrounded by a second layer of polyester tape optionally coated on its inner side with an adhesive layer;
    (d) said second tape layer surrounded by a braided sheath of strong polymer fibers;
    (e) said braided sheath surrounded by a layer of tape-wrapped binder tape; and
    (f) said binder tape layer surrounded by an extruded flame-resistant thermoplastic polymer layer.

2. A cable of claim 1, wherein said optical fibers are coated with an acrylic polymer and said fibers are at about zero distance apart.

3. A cable of claim 1, wherein said adhesive coating of said first layers of expanded polytetrafluoroethylene tape is selected from the group consisting of polyester. polyurethane and organosiloxane-urethane polymer.

4. A cable of claim 1, wherein said second layer of polyester tape is coated with a polyester adhesive.

5. A cable of claim 1, wherein said fibers of said braid comprise aramid fibers.

6. A cable of claim 1, wherein said jacket comprises polyvinyl chloride.

7. An assembly of a cable of claims 1, 2, 3, 4, 5, or 6 with an optical fiber connector.

8. A process for manufacture of an optical fiber ribbon cable comprising the steps:
   (a) passing from supply spools a multiplicity of polymercoated optical fibers and metal guide wires into an accumulator;
   (b) aligning within said accumulator said optical fibers and said guide wires into an essentially planar configuration, said accumulator comprising a multiplicity of sets of parallel rollers, half of which sets are at a right angle to said other half of said sets;
   (c) passing said parallel configured optical fibers and guide wires through an apertured guide in which said apertures are precisely configured to provide accurate spacing between said fibers and wires;
   (d) passing said precisely spaced fibers and wires, layered on each side with a heated expanded polytetrafluoroethylene tape coated on each side with an adhesive adjacent to said fibers and wires, and a heated polyester tape, optionally coated with an adhesive on the side adjacent said polytetrafluoroethylene tape, and adjacent said polytetrafluoroethylene tape together as a unit between the nip of a pair of grooved pressure rollers, said space in said nip and between said grooves being precisely adjusted so as to apply the requisite pressure to form an adhered insulation of polytetrafluoroethylene and polyester to said fibers and said wires;
   (e) supplying heated air to said tapes and said fibers and wires in advance of their entry between said rollers;
   (f) supplying cooled air to said cable subsequent to its exit from between said rollers;
   (g) trimming said guide wires from said cable and trimming the edges of said cable to yield precise spacing of said fibers from said edge of said cable;
   (h) braiding a sheath of strong polymer fibers around said trimmed cable;
   (i) tape-wrapping a layer of binder tape around said sheathed cable; and
   (j) extruding a flame-retardant thermoplastic jacket around said binder tape-wrapped cable.

* * * * *